(12) United States Patent
Sugita

(10) Patent No.: US 7,012,709 B2
(45) Date of Patent: Mar. 14, 2006

(54) PRINTER HAVING CONTROLLER TRANSMITTING COMMANDS TO PRINT ENGINE RESPONSIVE TO COMMANDS

(75) Inventor: Takatoshi Sugita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 911 days.

(21) Appl. No.: 09/880,062

(22) Filed: Jun. 14, 2001

(65) Prior Publication Data

US 2002/0015172 A1    Feb. 7, 2002

(30) Foreign Application Priority Data

Jun. 16, 2000  (JP) .......................... P.2000-180682
Aug. 14, 2000  (JP) .......................... P.2000-245836

(51) Int. Cl.
G06K 15/02     (2006.01)
G06F 3/12      (2006.01)

(52) U.S. Cl. .......................... 358/1.15; 358/1.13; 347/5
(58) Field of Classification Search .............. 358/1.15, 358/1.9, 1.2, 1.13; 347/5
See application file for complete search history.

(56) References Cited

U.S. PATENT DOCUMENTS

| 5,774,638 | A | * | 6/1998 | Kageyama et al. | ........ | 358/1.15 |
| 5,822,499 | A | * | 10/1998 | Okada et al. | ................ | 358/1.1 |
| 6,028,675 | A | * | 2/2000 | Fields et al. | ............... | 358/1.14 |
| 6,734,986 | B1 | * | 5/2004 | Kuroi et al. | ............... | 358/1.16 |

FOREIGN PATENT DOCUMENTS

| EP | 0 945 780 | 9/1999 |
| JP | 11-259246 | 9/1999 |
| JP | 2000-351511 | 12/2000 |

* cited by examiner

*Primary Examiner*—King Y. Poon
*Assistant Examiner*—Lucas Divine
(74) *Attorney, Agent, or Firm*—Oblon, Spivak, McClelland, Maier & Neustadt, P.C.

(57) ABSTRACT

Commands transmitted from an image processing controller to an engine are classified into a plurality of layers in response to the information contents of the commands and when the engine receives a command of a subordinate layer, it recognizes that the command is received together with the command of a superior layer to that command, last issued preceding the command. Therefore, the engine performs internal control in accordance with the second command of the subordinate layer received and the first command of the superior layer not received at the time, but last received preceding the second command. For various instructions concerning execution of print, the commands of the superior layer of commands representing the instructions are made common.

8 Claims, 12 Drawing Sheets

FIG. 3A

1ST COMMAND

| BIT 7 | BIT 6 | BIT 5 | BIT 4 | BIT 3 | BIT 2 | BIT 1 | BIT 0 |
|---|---|---|---|---|---|---|---|
| FIRST/SECOND IDENTIFICATION 0 | MAJOR CLASS | | | MIDDLE CLASS | | | PARITY BIT |

FIG. 3B

2ND COMMAND

| BIT 7 | BIT 6 | BIT 5 | BIT 4 | BIT 3 | BIT 2 | BIT 1 | BIT 0 |
|---|---|---|---|---|---|---|---|
| FIRST/SECOND IDENTIFICATION 1 | | MINOR CLASS | | | | | PARITY BIT |

FIG. 10

| PRINT MODE | NUMBER OF PRINTABLE SHEETS IN MINIMUM PRINT CYCLE | | |
|---|---|---|---|
| | ONE SHEET /CYCLE | TWO SHEETS /CYCLE | THREE SHEETS /CYCLE |
| (1) SINGLE-SIDED/COLOR/ SHORT PAPER | ○ | ○ | |
| (2) SINGLE-SIDED/COLOR/ LONG PAPER | ○ | | |
| (3) SINGLE-SIDED/MONOCHROME/ SHORT PAPER | ○ | ○ | |
| (4) SINGLE-SIDED/MONOCHROME/ LONG PAPER | ○ | | |
| (5) DOUBLE-SIDED/COLOR/ SHORT PAPER | ○ | ○ | |
| (6) DOUBLE-SIDED/COLOR/ LONG PAPER | ○ | | |
| (7) DOUBLE-SIDED/MONOCHROME/ SHORT PAPER | ○ | ○ | ○ |
| (8) DOUBLE-SIDED/MONOCHROME/ LONG PAPER | ○ | | |

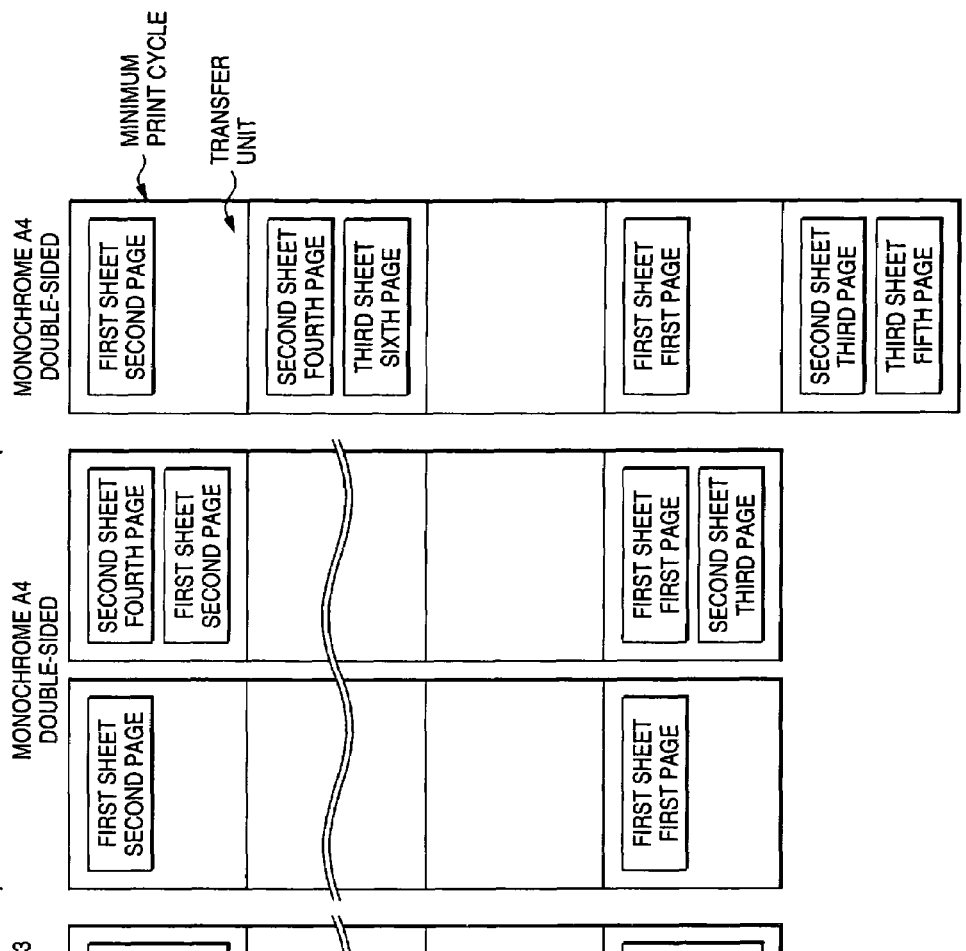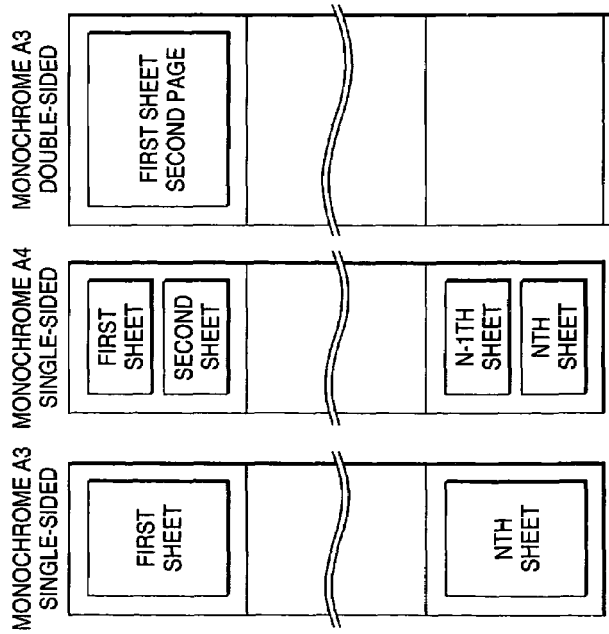

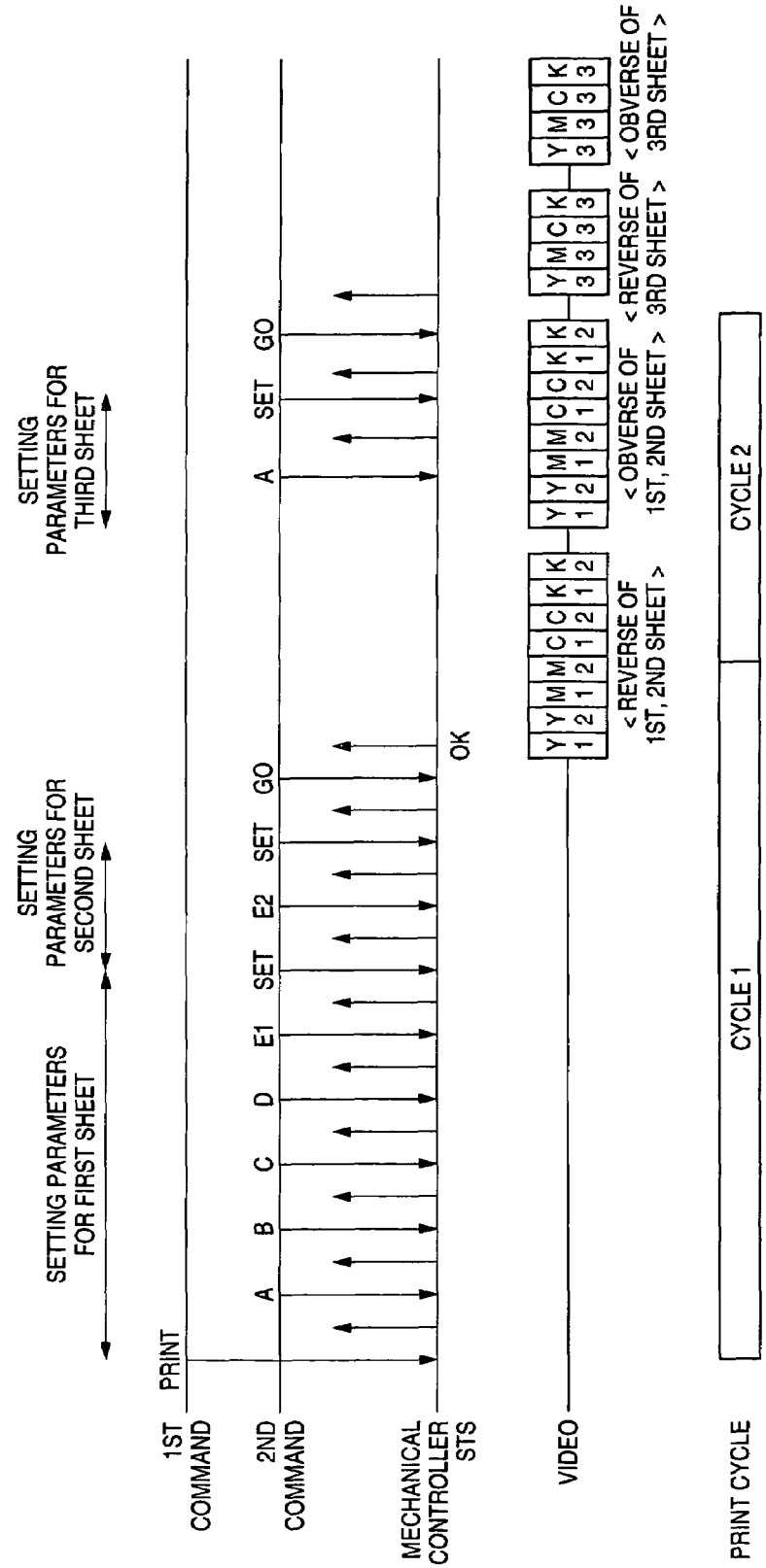

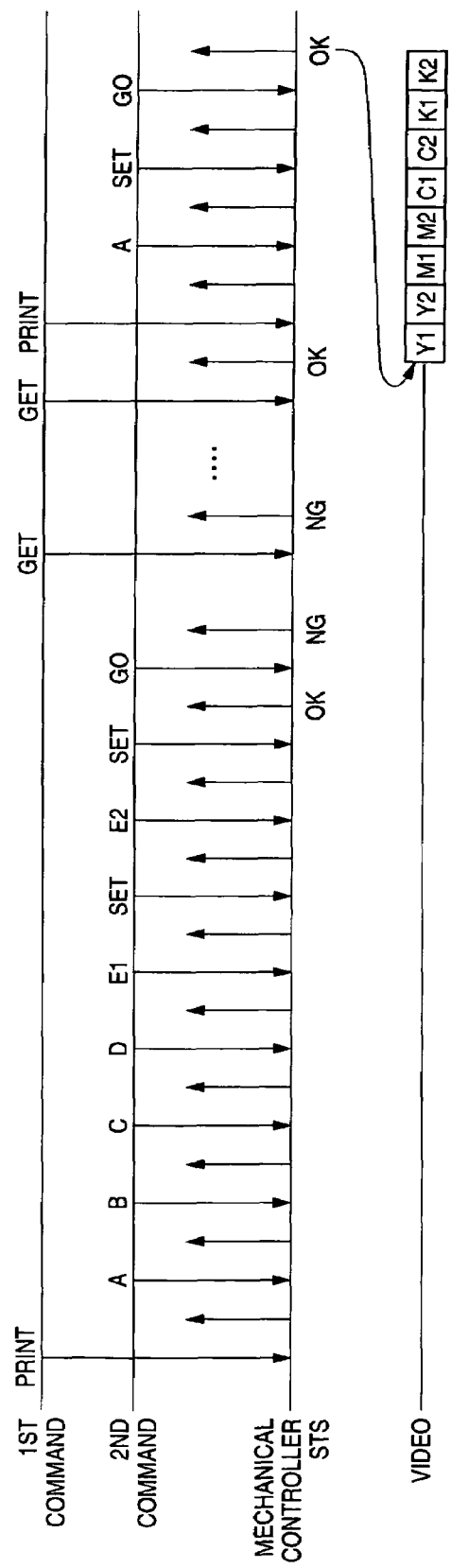

PRINTER HAVING CONTROLLER TRANSMITTING COMMANDS TO PRINT ENGINE RESPONSIVE TO COMMANDS

BACKGROUND OF THE INVENTION

1. Technical Field of the Invention

The invention relates to a printer having a controller for receiving print information and generating a command and an engine for executing print in accordance with the command, particular to a printer capable of transferring various types of information from the controller to the engine by the command in a short time, and a new communication protocol on a video interface between a the engine and the controller.

2. Related Art

FIG. 6 is a schematic drawing to show the electric configuration of a printer in a related art. A printer 1 is connected to a host computer 2 such as a personal computer and executes print based on a print command from the host computer 2. The printer 1 is roughly divided into an image processing controller 3 and an engine 4. When a command is issued from the host computer 2, first the image processing controller 3 receives print information and generates commands given to the engine 4 and image data to be printed based on the received print information.

As shown in FIG. 6, the engine 4 is roughly divided into a mechanical controller 5 for controlling a mechanical section 6 and this mechanical section 6. When the generated commands are issued from the image processing controller 3, the mechanical controller 5 receives the commands and controls parts of the mechanical section 6 in accordance with the commands for executing print. Usually, the engine 4 is constructed by a paper feed unit, a photo sensitive unit, a transfer unit, a fixing unit, a paper discharge unit, etc. Specifically, the mechanical controller 5 controls motors, clutches, sensors, etc., placed in the units.

As shown in FIG. 6, an interface section between the image processing controller 3 and the mechanical controller 5 is called a video interface section 7. The video interface section 7 usually comprises dedicated lines for transferring specific signals, such as a communication line for announcing mutual power stable state and a communication line for transmitting video data, and a serial communication line for transmitting the above-mentioned commands. On the serial communication line, each command is transmitted from the image processing controller 3 to the mechanical controller 5 and the mechanical controller 5 responds to the command with a status returned to the image processing controller 3. The status mainly indicates the state of the engine 4 and the image processing controller 3 grasps the state of the engine 4 based on the returned status.

In the printer in the related art, the serial communications are designed for returning a one-byte state in response to a one-byte command.

In the printer in the related art, particularly for monochrome print, the types of information transferred on the video interface section 7 are relatively small in number and selective information pieces are also small in number, so that main information is transferred over the dedicated lines and the serial communications are used for mainly transferring exceptional information such as error information. Therefore, the types of information are small in number and it is sufficient to provide one byte for a command and one byte for a status, as described above.

However, in a recent printer being capable of executing color print and having a wide variety of functions, the types of information to be sent from the image processing controller 3 to the mechanical controller 5 are also many and the number of selective information pieces also grows. It is preferable that a large number of types of information as mentioned are transferred with commands in serial communications without using the dedicated lines, but one-byte commands are not adequate for transferring a large number of types of information as mentioned. Therefore, if the communication architecture of the printer in the related art is not changed, it becomes necessary to transmit a one-byte command twice or more to transfer a piece of information, thereby increasing the communication time.

Further, in some sort of the recent printer using a laser beam, such as a page printer, the mechanical section in the engine has a photoconductive drum where a latent image is formed by a laser beam and charged toner is deposited and a transfer unit for superposing and transferring toner images formed on the photoconductive drum, wherein the superposed and transferred toner image on the transfer unit is transferred to a print medium such as print paper. For such printer capable of executing color print, various print modes such as monochrome print, color print, single-sided print, double-sided print, and sort output to a multi-bin unit have been required to be selected as desired. In such a large-scale electronic printer, much print information needs to be transferred between the image processing controller and a mechanical controller in a print engine. Thus, the transfer capacity of an interface needs to be increased; this results in an increase in costs. Therefore, optimizing the protocol of the interface is an indispensable requirement for increasing the print speed.

SUMMARY OF THE INVENTION

It is therefore an object of the invention to provide a printer for making it possible to transfer a large number of types of information by commands without incurring a drastic increase in the communication time without changing the communication architecture in the related art on a video interface between an image processing controller and an engine.

It is another object of the invention to provide an electronic printer having an interface of an optimized protocol between an image processing image processing controller and a mechanical controller in a print engine.

It is another object of the invention to provide an electronic printer capable of optimizing an interface protocol between an image processing image processing controller and a mechanical controller in a print engine and increasing print speed.

It is another object of the invention to provide an electronic printer capable of optimizing an interface protocol between an image processing image processing controller and a mechanical controller in a print engine and preventing print trouble when an error occurs.

To achieve the above-mentioned objects, according to a first aspect of the invention, there is provided a printer comprising:

a controller for transmitting commands for representing various instructions; and an engine for executing print based on the transmitted commands, wherein the commands are classified into a plurality of layers, each of the instructions is determined by at least a first command of a superior layer and a second command of a subordinate layer of the plurality of layers, when the engine receives the first and second commands, the engine executes the instruction specified by the first and second commands, and when the engine receives the second command without receiving the first command, the engine executes the instruction specified by the first command last received and the second command now received.

Therefore, according to the first aspect of the invention, transmission of the duplicate superior-layer commands can be skipped and a larger number of types of information than that in the related art can be transferred without incurring a drastic increase in the communication time while the communication architecture in the related art is maintained.

According to a second aspect of the invention, in the printer of the first aspect, each of the commands contains information concerning the layer in which the command belongs.

According to a third aspect of the invention, in the printer of the first aspect, when the engine receives the commands for setting parameters transmitted in the print execution time, the engine holds setup values of the parameters transmitted by the commands until reception of another command for setting each of the parameter.

According to a fourth aspect of the invention, in the printer of the first aspect, after execution of previous print in the print execution time, when the engine receives commands for setting all parameters to be set after execution of the previous print, the engine executes print in accordance with setup values of the parameters of the commands, and when the engine receives commands for setting a part of the all parameters, the engine executes print in accordance with the setup values of the parameter of the received commands for the part of the all parameters and in accordance with the setup values of the last received commands for the other parameters than the part of the all parameters.

According to a fifth aspect of the invention, in the printer of the first aspect, when the instructions includes an instruction regarding execution of print, the instruction regarding the execution of print is specified by the first command, and another instruction which varies in accordance with the each of instructions is specified by the second command, each of instructions concerning execution of print is specified by a first command meaning execution of print and a second command varying in accordance with the instructions.

According to a sixth aspect of the invention, in the printer of the first aspect, the second command include a print information command and a set command meaning determination of the instruction for each print page.

According to an seventh aspect of the invention, in the printer of the sixth aspect, the engine executes the instruction for a current print page based on the print information command received preceding the current set command and the print information command received prior to the preceding set command in response to the set command.

According to an eighth aspect of the invention, in the printer of the sixth aspect, the instruction for a current print page is specified by the current commands for the current page and the preceding commands for the preceding page different from the current commands in response to the set command.

Further to achieve the above-mentioned objects, according to a ninth aspect of the invention, there is provided a printer for executing print in response to a print information, said printer comprising:

an image processing controller for performing image processing based on the print information;

an engine having a minimum print cycle for forming one or more images on an intermediate medium, transferring the image to a print medium, and discharging the print medium; and a mechanical controller in the engine which sets print parameters for each print page in response to a plurality of print commands supplied from the image processing controller and a set command for each print page supplied after the print commands, wherein the mechanical controller starts printing in response to a go command supplied after one or more set commands.

According to a tenth aspect of the invention, in the printer of the ninth aspect, the number of printed sheets in the minimum print cycle is set according to the number of the set commands issued before the go command.

According to an eleventh aspect of the invention, in the printer of the ninth aspect, the mechanical controller sets the print parameters for the current print page based on the print command received prior to the current set command and the print command received preceding the preceding set command in response to the set command.

According to a twelfth aspect of the invention, in the printer of the ninth aspect the image processing controller transfers print image data to the mechanical controller in synchronization with a print operation of the engine after issuing the go command.

According to a thirteenth aspect of the invention, in the printer of any one of the ninth to twelfth aspects, the minimum print cycle contains one transfer cycle in which an image is formed in the intermediate medium and is transferred to the print medium when single-sided print is performed, the minimum print cycle contains at least two transfer cycle when double-sided print is performed.

According to a fourteenth aspect of the invention, in the printer of the ninth aspect, the mechanical controller returns a status signal to the image processing controller in response to each of the commands, wherein the image processing controller stops transferring the print image data to the mechanical controller and cancels printing when the image processing controller receives a status signal indicating a print-impossible state responding to the go command, even if the image processing controller receives a status signal indicating a print-possible state responding to the set command.

According to a fifteenth aspect of the invention, in the printer of the fourteenth aspect, command transfer and status transfer between the image processing controller and the mechanical controller are executed as serial communication.

According to a sixteenth aspect of the invention, in the printer of the thirteenth aspect, the image processing controller issues a get command forgetting another status signal after receiving the status signal indicating the print impossible state, the image processing controller issues the go command and then transfers the print image data when the status signal in response to the get command indicates the print-possible state.

According to a seventeenth aspect of the invention, in the printer of the thirteenth aspect, the image processing controller issues a get command for getting another status signal after receiving the status signal indicating the print impossible state, the set command and the go command and then transfers print image date when the gotten status signal indicates the print-possible state, the image processing controller issues the print commands.

Other and further objects and features of the invention will appear more fully from the following description.

The present disclosure relates to the subject matter contained in Japanese patent application Nos. 2000-180682 (filed on Jun. 16, 2001) and 2000-245836 (filed on Aug. 14, 2001), which are expressly incorporated herein by reference in their entireties.

BRIEF DESCRIPTION OF THE DRAWINGS

FIGS. 3A and 3B are drawings to show an example of the bit patterns of first and second commands adopted by a printer according to a first embodiment of the invention;

FIG. 10 is a table to show the relationship between print mode and the number of toner images (sheets) that can be printed in a minimum print cycle;

FIGS. 11A to 11E are a drawing to show the relationship between minimum print cycles and transfer cycles for monochrome print;

FIG. 14 is a timing chart of the video interface in the print mode of double-sided, color, three sheets of short paper; and FIG. 15 is a timing chart of the video interface in print when an error occurs.

DETAILED DESCRIPTION OF PREFERRED EMBODIMENT

Figure 1:
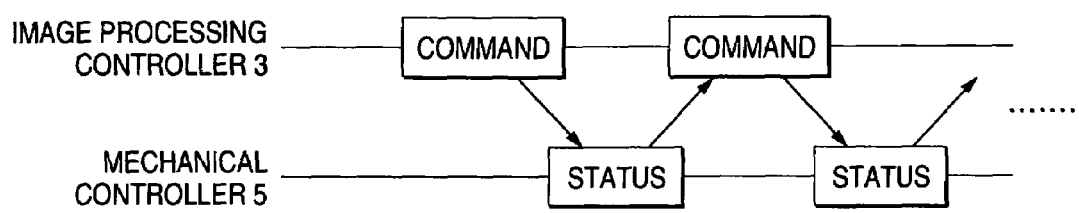
FIG. 1 is a drawing to show transfer of commands and statuses between an image processing controller and a mechanical controller.

Referring now to the accompanying drawings, there is shown a preferred embodiment of the invention. However, the specific embodiment does not limit the technical scope of the invention. Parts described with reference to one drawing, similar to or identical with those described with reference to another drawing are denoted by the same reference numerals or reference symbols.

First Embodiment

Referring to FIGS. 1 to 6, a detailed description will be given of a first embodiment of the invention.

Figure 6:
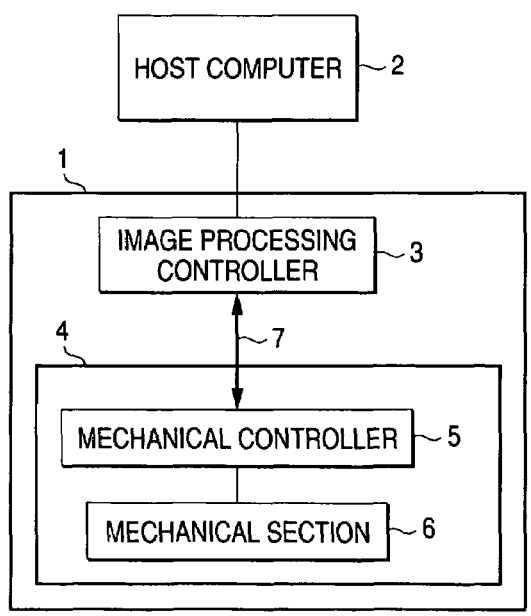
FIG. 6 is a schematic drawing to show the electric configuration of a printer in a related art.

The first embodiment of a printer, to which the invention applies, has a similar electric configuration to that of the printer in the related art, as shown in FIG. 6. A printer 1 has an image processing controller 3 and an engine 4 constructed by a mechanical controller 5 and a mechanical section 6. The image processing controller 3 receives print information from a host computer 2 and generates various commands for instructing the engine 4 to print and image data to be printed. Upon reception of a command transmitted from the image processing controller 3, the mechanical controller 5 controls parts of the mechanical section 6 in accordance with the command for executing print.

A video interface section 7 between the image processing controller 3 and the mechanical controller 5 comprises various dedicated communication lines and a serial communication line for transmitting the above-mentioned commands as in the related art. On the serial communication line, transmission of a one-byte command from the image processing controller 3 to the mechanical controller 5 and return of a one-byte status signal from the mechanical controller 5 responding to the command to the image processing controller 3 are repeated, as shown in FIG. 1. The status signal from the mechanical controller 5 is transmitted only when the command from the image processing controller 3 is received, and the status signal cannot be transmitted at an arbitrary timing from the mechanical controller 5.

As described above, the printer 1 according to the first embodiment makes it possible to transfer a larger number of types of information than that in the related art by designing the bit pattern of each command while maintaining the electric configuration of the printer and the communication architecture in the video interface section in the related art without drastically increasing the communication time.

Figure 2:
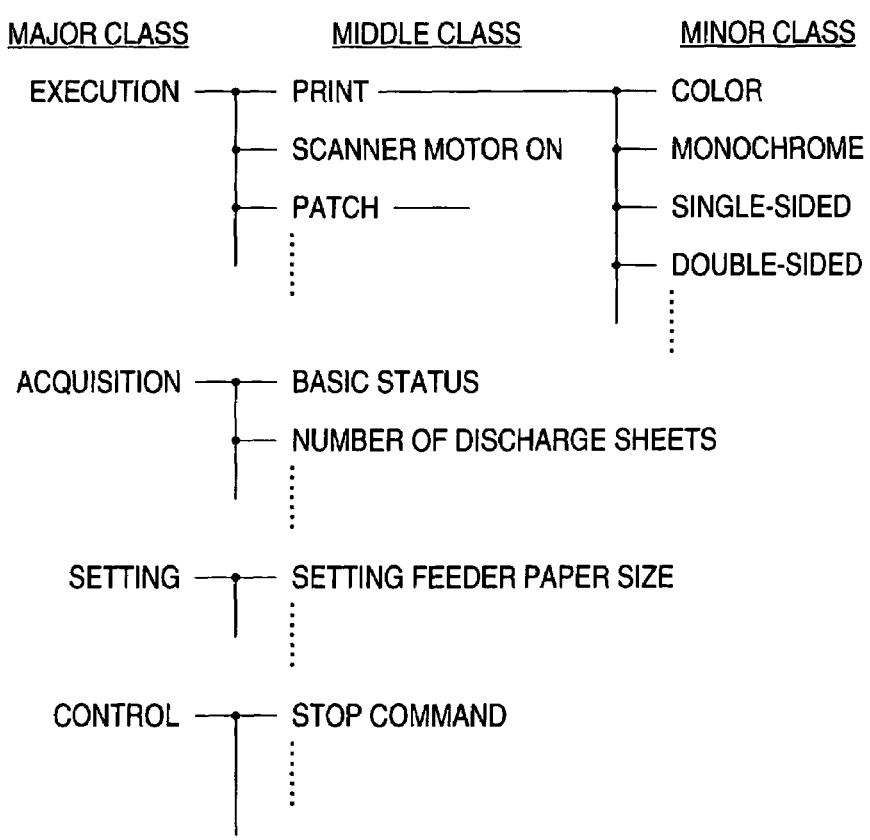
FIG. 2 is a drawing to represent one example of systematic classification of information to be transferred from the image processing controller and the mechanical controller.

In the printer 1, the information to be transferred from the image processing controller 3 to the mechanical controller 5 is classified systematically according to the contents of the information. FIG. 2 is a drawing to represent one example of systematic classification of the information to be transferred from the image processing controller 3 to the mechanical controller 5. In this example, the information to be transferred is classified into three hierarchies of major, middle, and minor. The major class includes four categories as shown in FIG. 2; EXECUTION contains information of various instructions required for causing the engine 4 to execute print, etc., as middle and minor classes. For example, EXECUTION/PRINT/COLOR in the figure provides information indicating execution of color print.

ACQUISITION is information issued for the image processing controller 3 to announce the state of the engine 4; ACQUISITION/NUMBER OF DISCHARGED SHEETS provides information indicating that the number of discharged sheets of paper sensed by a sensor of the engine 4 is to be returned to the image processing controller 3 as a status. Likewise, SETTING is information issued to execute basic setting of the parts of the engine 4, such as feeder paper size, and CONTROL is information issued to give a special command to the engine 4, such as a stop command.

The information classified as above-mentioned is represented as commands and is transferred from the image processing controller 3 to the mechanical controller 5. In the printer 1, there are many types of information to be transferred, and therefore the information cannot be transferred as unique information by a one-byte command. As described above, the printer adopts the communication system of transferring one-byte commands and one-byte statuses as with the printer in the related art. Then, in the printer 1, the commands are roughly classified into first and second commands each of one-byte length, and one unique information piece is transferred to the engine 4 by transmitting one first command and one second command.

FIGS. 3A and 3B are drawings to show an example of the bit patterns of the commands adopted by the printer 1. FIG. 3A represents the bit pattern of the first command and FIG.

3B represents the bit pattern of the second command. As shown in the figures, the first command represents the major class and middle class of the systematically classified information to be transferred and the second command represents the minor class. Therefore, based on the system of the information to be transferred, the first command is a superior-layer command for transferring superior wide information and the second command is a subordinate-layer command to the first command for transferring detailed information.

In the example of the bit patterns shown in the figures, two bits are assigned to the major class and four bits are assigned to the middle class, so that 4 categories of major class and 16 categories of middle class can be provided. Since six bits are assigned to the minor class, 64 categories of minor class can be provided for each middle class entry. The bit assignments can be determined appropriately according to the classification of the information to be transferred. As shown in FIGS. 3A and 3B, each of the first and second commands is provided with a parity bit (bit 0) and a bit for identifying the first or second command (bit 7). Based on this identification bit, the mechanical controller 5 can determine whether the command transmitted as a one-bit length is the first or second command.

Figure 4A:
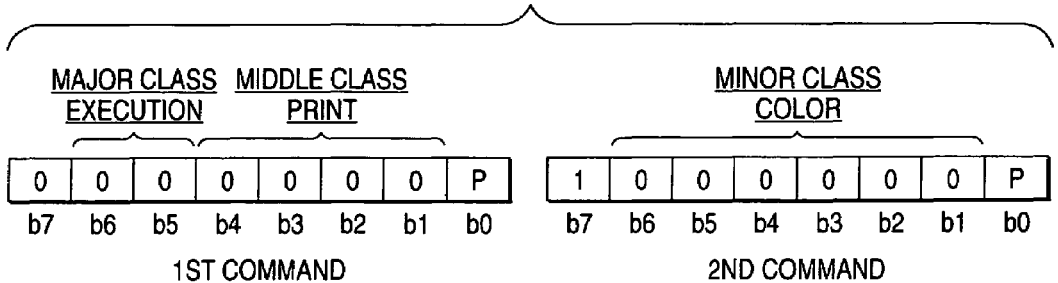
FIGS. 4A to 4C are drawings to show examples of the commands in the printer.
Figure 4B:
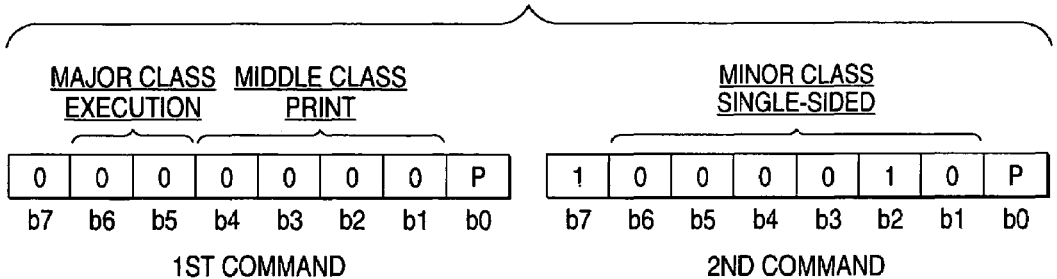
Figure 4C:
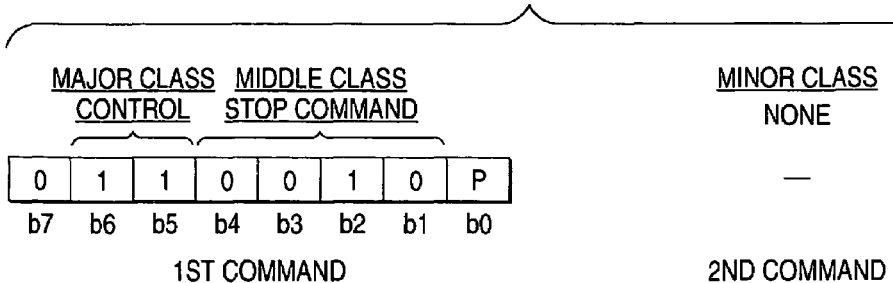

FIGS. 4A to 4C are drawings to show examples of the commands in the printer. FIG. 4A represents commands corresponding to information of EXECUTION/PRINT/ COLOR. As described above, the first command represents EXECUTION/PRINT and the second command represents COLOR. Therefore, to instruct the mechanical controller 5 to execute color print, as a rule, the first command and the second command shown in the figures are transmitted from the image processing controller 3. FIG. 4B represents commands corresponding to information of EXECUTION/ PRINT/SINGLE-SIDED. Likewise, to instruct the mechanical controller 5 to execute single-sided print, as a rule, the two commands need to be transmitted.

In the printer 1, however, if the first command of the information to be transmitted is the same as the first command last issued preceding that first command, the first command is omitted and only the second command is transmitted. In other words, the mechanical controller 5 holds the contents of the first command last received until reception of another first command, and when the second command is received, the mechanical controller 5 assumes that the second command is received together with the first command held, and determines the information transferred from the image processing controller 3. This point is one of the major features of the printer 1.

In the example in FIG. 4, if the information shown in FIG. 4B is transmitted just after the information shown in FIG. 4A is transmitted, the first commands are the same and thus when the information shown in FIG. 4B is transmitted, only the second command needs to be transmitted. FIG. 4C shows a command corresponding to CONTROL/STOP COMMAND. Thus, no minor class is provided depending on the information to be transferred; in this case, only the first command is transmitted, of course.

Thus, in the printer according to the first embodiment, a larger number of types than that in the related art can be transferred by commands of two layers, and commands of two layers need not always be transmitted, so that the communication time is not drastically increased as compared with the printer in the related art wherein one information piece is transmitted by one command.

If the information is classified so that information groups often consecutively transmitted are contained in the same superior group (middle class), the first commands of the commands for representing the information groups become same as the preceding first commands, and the occasions wherein transmission of the first command can be skipped are increased. Therefore, it is effective to shorten the communication time. Specifically, as shown in FIG. 2, it is effective to collect commands of parameters given consecutively at the print execution time (COLOR, SINGLE-SIDED, etc., in FIG. 2) as one class (EXECUTION/PRINT in FIG. 2).

Further, in the printer, if the command value of each parameter at the print execution time is the same as the value at the preceding print execution time, issuance of the command indicating the parameter can be skipped. Thus, when the mechanical controller 5 receives a command indicating each parameter at the print execution time (belonging to EXECUTION/PRINT in FIG. 2 or the like), the mechanical controller 5 holds the contents of the command and executes each print based on the held command contents until reception of another command including a parameter. Therefore, the image processing controller 3 may issue a command only for the parameter different in value from the held parameter in the mechanical controller 5 at the preceding print execution time; the communication time can also be shortened according to this feature.

Figure 5:
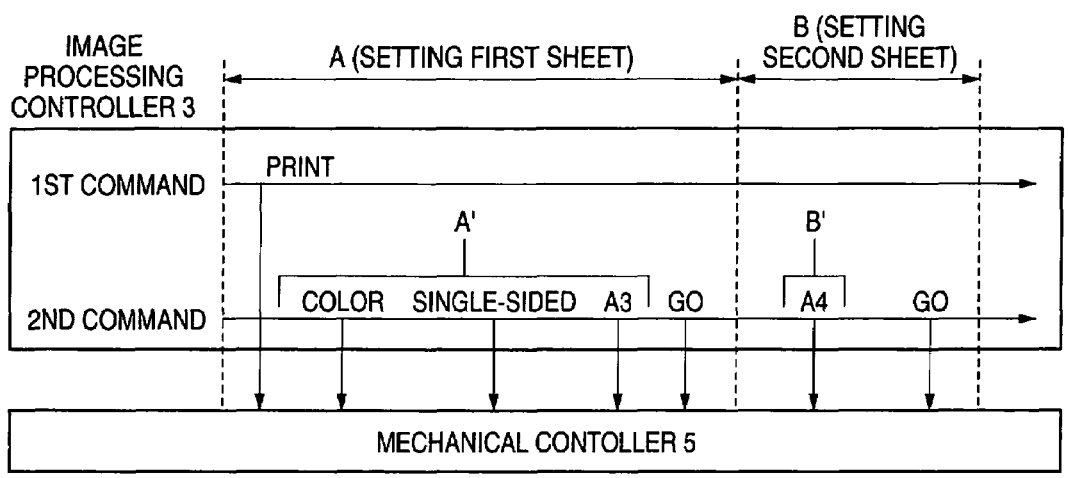
FIG. 5 is a drawing to illustrate a sequence of commands issued from the image processing controller to the mechanical controller in a time series.

FIG. 5 is a drawing to illustrate a sequence of commands issued from the image processing controller 3 to the mechanical controller 5 in a time series when printing two sheets of paper. In the figure, a portion A represents commands issued for printing the first sheet of paper and a portion B represents commands for printing the second sheet of paper. First, the image processing controller 3 issues the first command meaning EXECUTE/PRINT and the second command meaning COLOR illustrated in FIG. 2 to the mechanical controller 5, and the mechanical controller 5 recognizes the two received commands as EXECUTE/ PRINT/COLOR.

Next, the image processing controller 3 gives an instruction of EXECUTE/PRINT/SINGLE-SIDED. To give the instruction, the first command is the same as that first command mentioned above and thus transmission of the first command is skipped and only the second command meaning SINGLE-SIDED is transmitted as described above. The mechanical controller 5 assumes that the received second command is received together with the first command mentioned above, and recognizes the instruction contents as EXECUTE/PRINT/SINGLE-SIDED. Likewise, setting of EXECUTE/PRINT/PLAIN PAPER and EXECUTE/ PRINT/A3 represented by the same first command is executed only by the second commands. Therefore, for setting of the parameters (portion of A' in the figure) consecutively executed at the print execution time, only first command may be transmitted once. GO in the figure is a second command for giving an instruction of print execution.

In the example in FIG. 5, next a print instruction of the second sheet of paper different from the first sheet only in paper size parameter is given. In this case, a command may be transmitted only for the parameter having a different value as described above and thus the commands meaning EXECUTE/PRINT/A3 are transmitted. In fact, however, also at this time, the first command is the same as the first command last issued and thus only the second command meaning A4 may be transmitted as shown in a portion of B' in FIG. 5. Thus, the transferred information is represented so as to become unique by commands of two hierarchies, but the number of commands actually transmitted can be minimized.

As described above, in the printer according to the first embodiment, the information to be transferred from the image processing controller to the engine is represented by the one-byte first command and the one-byte second command put into hierarchy, whereby a larger number of types of information than that in the related art can be transferred while the communication architecture in the related art is maintained, and the number of transmitted commands can be reduced by the function of skipping transmission of the first command and the function of holding the setup parameter value in the engine, so that the communication time is not drastically increased as compared with that in the related art. Further, the first commands are made the same in parameter setting instructions at the print execution time, whereby the number of times which the first command can be omitted is increased at the print execution time for which the communication time is to be shortened as much as possible. The commands are classified systematically according to the contents of the commands, whereby the commands can also be easily understood at the development time and at the maintenance time.

In the first embodiment, an instruction transferred from the image processing controller to the engine is represented by commands of two layers. However, if the types of instructions to be transferred are more, an instruction may be represented by commands of three or more hierarchies. Also in this case, when the engine receives a command of a subordinate layer, it is recognized that the command is received together with the command of a superior layer last received preceding that command, whereby the number of times each command can be decreased.

Second Embodiment

Referring to FIGS. 7 to 10, a detailed description will be given of a second embodiment of the invention.

Figure 7:
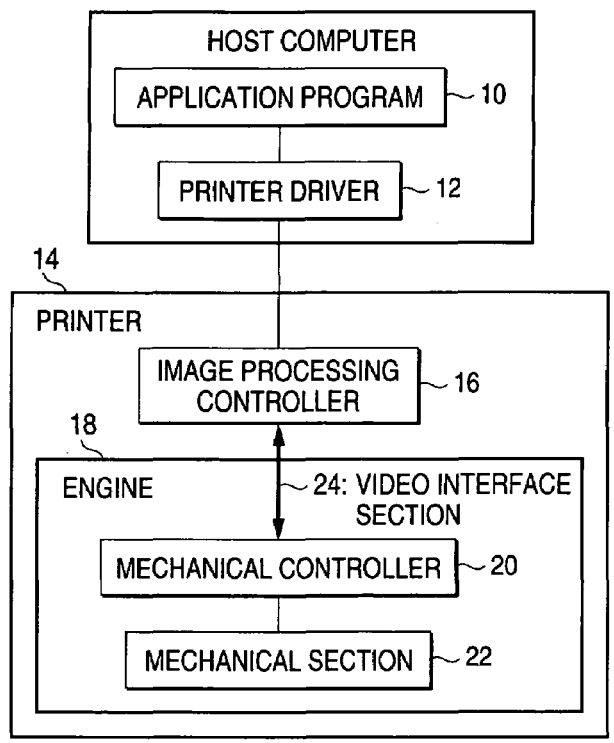
FIG. 7 is a general block diagram of an electronic printer in an second embodiment of the invention.

FIG. 7 is a general block diagram of an electronic printer in a second embodiment of the invention. A printer 14, an electronic printer, contains a image processing controller 16 for performing image processing for a print information supplied from a host computer such as a personal computer and an engine 18 for executing print in accordance with a print setting command and print image data supplied from the image processing controller 16. For example, an application program 10 for generating image data and a printer driver 12 for generating a print information corresponding to the generated image data and supplying the print information to the printer 14 are installed in the host computer.

The image processing controller 16 for image processing interprets a print information is color print, the image processing controller 16 performs color conversion processing and binarization processing for generating print image data if the print information and generates print commands containing a print instruction and setup parameter corresponding to the print information. The engine 18 has a mechanical section 22 and a mechanical controller 20. The mechanical section 22 is for forming toner images on intermediate media such as a photoconductive drum and a transfer unit and transferring the toner image to a print medium such as print paper. The mechanical controller 20 is for controlling the mechanical section 22. A video interface section 24 is placed between the image processing controller 16 and the mechanical controller 20. The print commands and the print image data are supplied from the image processing controller 16 through the video interface section 24 to the mechanical controller 20. In addition, various control signals are transferred through the video interface section 24.

Figure 8:
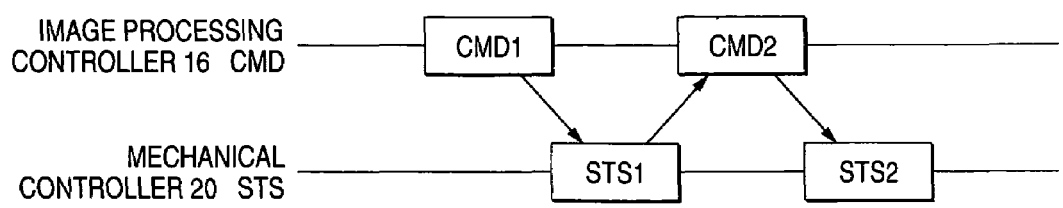
FIG. 8 is a drawing to describe a video interface in the second embodiment of the invention.

FIG. 8 is a drawing to describe the video interface section in the second embodiment. In addition to various control signal lines, a command signal line for serially transferring an eight-bit command, for example, and a status signal line for serially transferring an eight-bit status signal, for example, are provided between the image processing controller 16 and the mechanical controller 20. The image processing controller 16 and the mechanical controller 20 have master-slave relationship, namely, the image processing controller 16 can issue a command at its own timing, but the mechanical controller 20 only responds to a received command with a status signal returned to the image processing controller 16 and cannot issue a command or a status signal at its own timing.

Whenever the image processing controller 16 supplies a command CMD consisting of eight bits to the mechanical controller 20 by serial communications for setting each parameter, the mechanical controller 20 returns an eight-bit status signal STS indicating the state in the print engine and also serving as acknowledgement of the command by serial communications. Upon reception of the status signal STS, the image processing controller 16 checks that the transmitted command is normally received, and if necessary, transmits another command CMD.

Print parameters for one page are specified by a plurality of commands CMDs issued by the image processing controller 16. To deal with more diversified print modes, the commands CMDs are put into a hierarchy; a print instruction (print command), an initial value setting instruction (put command), a state getting instruction (get command), and a sleep mode change instruction, etc., (control command) are specified by first-layer commands and parameters of the first-layer commands are set by second-layer commands, as described later. A parameter may be set by a single second-layer command or may be set by more than one second-layer command.

For example, the print instruction involves selection of print mode (1) single-sided or double-sided, (2) color or monochrome, (3) what paper size, (4) which paper discharge destination (finisher or which stage of multi-bin unit, etc.,) and the like. Therefore, to set the print modes, two or more second-layer commands need to be issued.

Figure 9:
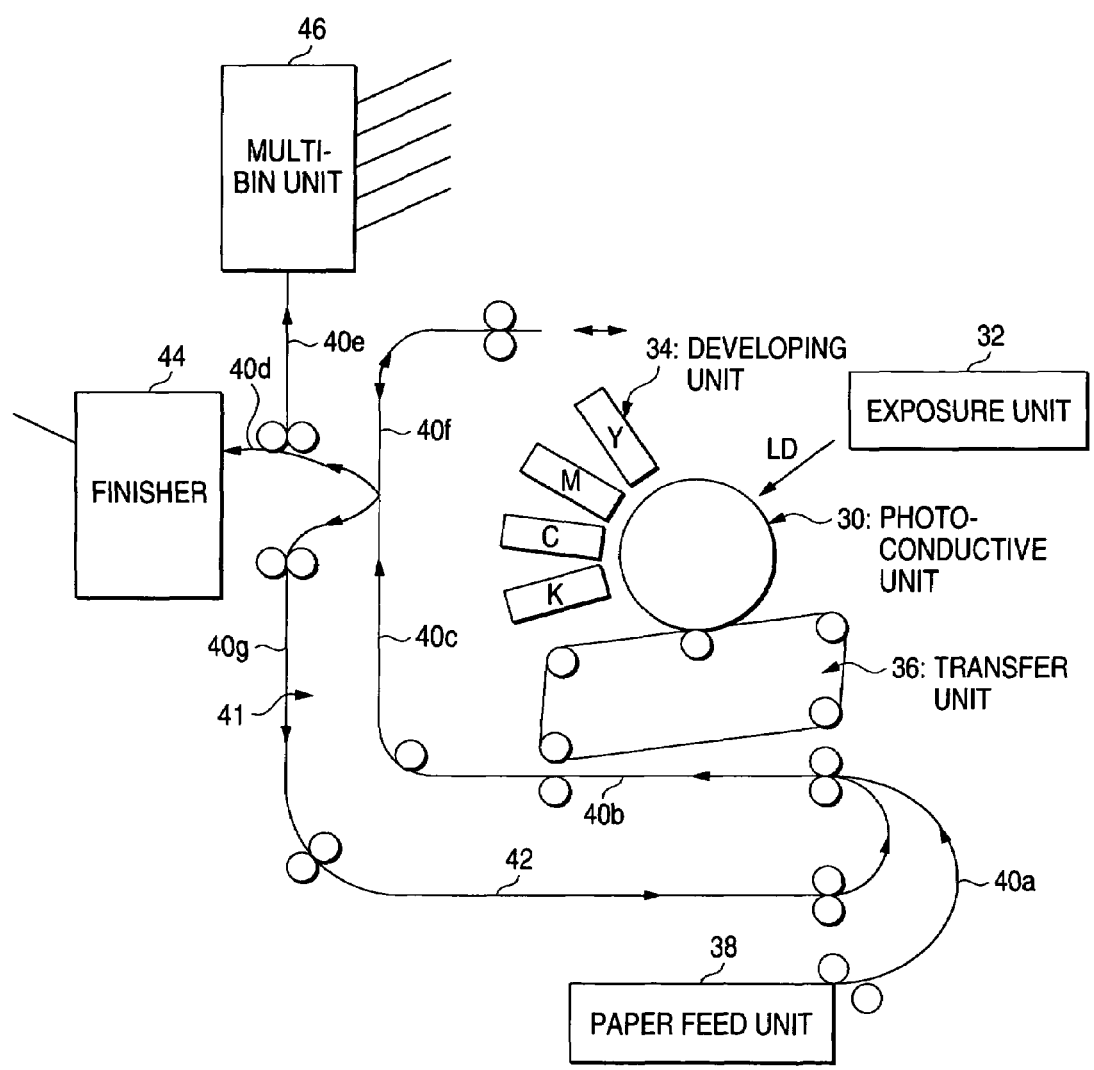
FIG. 9 is a general view of a print engine in the second embodiment of the invention.

FIG. 9 is a general view of the engine in the second embodiment. The engine superposes four color toners of yellow (Y), cyan (C), magenta (M), and black (K) to form a full color image or forms a monochrome image using only the black (K) toner. In the print engine, an exposure unit 32 turns on/off a laser beam in accordance with print image data supplied from the image processing controller and forms a latent image on a photoconductive drum 30 in a minimum print cycle (described later). Toner of a developing unit 34 is deposited on the latent image, forming a toner image. The toner image formed on the photoconductive drum 30 is transferred to a transfer unit 36. For color print, the transfer unit 36 is turned four turns to transfer toner images of four colors thereto. The superposed toner image is transferred to a print medium such as record paper coming from a paper feed unit 38 via a passage 40a of a print medium.

The print medium to which the image is transferred undergoes fixing treatment and then is passed through a passage 40c in a paper discharge unit 41 and is discharged to a finisher 44 or a multi-bin unit 46. For double-sided print, a print medium makes a U-turn in a passage 40f and is returned from a passage 40g via a double-sided paper re-feed unit 42. A toner image again formed on the transfer unit 36 is transferred to a reverse side of the print medium and the print medium is discharged from the paper discharge unit 41 to the finisher 44 or a multi-bin unit 46. Therefore, for the double-sided color print, the transfer unit 36 is turned eight turns to form images on the obverse and reverse of the print medium.

The cycle, in which one or more toner images that can be transferred to the print medium are formed on the transfer unit 36 and are transferred to the print medium, is called minimum print cycle. Therefore, if the print mode is single-sided print, one minimum print cycle contains one transfer cycle in which a toner image is formed on the transfer unit 36 and is transferred to a print medium. If the print mode is double-sided print, one minimum print cycle contains two transfer cycles. That is, in the example, in one transfer cycle, the transfer unit 36 is turned four turns in the color print mode or one turn in the monochrome print mode. In one minimum print cycle, the transfer unit 36 is turned four turns (one transfer cycle) in the single-sided color print mode, eight turns (two transfer cycles) in the double-sided color print mode, one turn (one transfer cycle) in the single-sided monochrome print mode, or two turns (two transfer cycles) in the double-sided monochrome print mode.

The transfer unit 36 of an intermediate medium is designed as a size for allowing an A3-size toner image, for example, to be formed. In doing so, two toner images of A4 size of a half the A3 size can be formed. Consequently, in one minimum print cycle, one toner image of A3 size or two toner images of A4 size can be formed. Since the rotation speed of the transfer unit 36 is constant, if more than one image can be formed on the transfer unit 36, the print speed can be increased.

FIG. 10 is a table to show the relationship between the print mode and the number of toner images (sheets) that can be printed in the minimum print cycle. In the figure, "short paper" means an A4-size print medium and "long paper" means an A3-size print medium. As shown in FIG. 10, if the print mode is single-sided/color/short paper, one or two toner images (sheets) can be printed in one minimum print cycle. If the print mode is single-sided/color/long paper, only one toner image (sheet) can be printed in one minimum print cycle. This also applies if the print mode is single-sized/monochrome. On the other hand, if the print mode is double-sided/color/short paper, one or two toner images (sheets) can be printed in one minimum print cycle. If the print mode is double-sided/color/long paper, only one toner image (sheet) can be printed in one minimum print cycle. If the print mode is double-sided/monochrome/short paper, up to three toner images (sheets) can be printed, and if the print mode is double-sided/monochrome/long paper, only one toner image (sheet) can be printed. The reason why three toner images (sheets) can be printed if the print mode is double-sided/monochrome/short paper is as follows:

FIGS. 11A to 11E are drawings to show the relationship between the minimum print cycles and the transfer cycles for monochrome print. It shows specifically how toner images are formed on the transfer unit 36 of an intermediate medium and are transferred to print media. In FIGS. 11A to 11E, the thick frame indicates each minimum print cycle and the thin line indicates the transfer unit boundary.

FIG. 11A shows the print mode of monochrome/long paper (A3)/single-sided print, a first toner image is formed on the full face of the transfer unit 36 and is transferred to a print medium of print paper. In this case, the minimum print cycle contains one transfer cycle. FIG. 11B shows the print mode of monochrome/short paper (A4)/single-sided print, two toner images are formed on the transfer unit 36 and are transferred to two print media. In this case, the minimum print cycle also contains one transfer cycle.

FIG. 11C shows the print mode of monochrome/long paper (A3)/double-sided print, first a toner image on the second page (reverse) is formed on the full face of the transfer unit 36 and is transferred to a print medium. The print medium undergoes the fixing treatment and then is inverted on an inversion passage (40c, 40f, 40g in FIG. 9) and is supplied to the double-sided paper re-feed unit 42. While the print medium passes through the inversion passage, the transfer unit 36 maybe idly rotated a predetermined number of times (for example, two) if necessary. A toner image on the first page (obverse) is formed on the full face of the transfer unit 36 and is transferred to the print medium. After this, the print medium is discharged. Therefore, in this case, the minimum print cycle contains two transfer cycles. However, idling of the transfer unit 36 is not contained in the number of transfer cycles.

FIG. 11D shows the print mode of monochrome/short paper (A4)/double-sided print; the left shows printing of one sheet and the right shows printing of two sheets. Printing double sides of one sheet is the same as printing double sides of an A3-size sheet in FIG. 11C. However, each toner image is formed using a half surface of the transfer unit 36. Since it takes time in inverting the print medium in the inversion passage for double-sided print, forming toner images of two pages of the obverse and the reverse of the medium on the transfer unit 36 as in FIG. 11B is not possible. Further, to print double sides of two sheets, as shown in the right of FIG. 11D, first a toner image of the fourth page (reverse) of the second sheet and a toner image of the second page (reverse) of the first sheet are formed on the transfer unit 36 and are transferred to two print media at the same time. When the two print media are inverted and again fed, a toner image of the first page (obverse) of the first sheet and a toner image of the third page (obverse) of the second sheet are formed on the transfer unit 36 and are transferred to the two print media. In this case, to print the reverse side, the first print medium is supplied following the second print medium and when the media are inverted in the inversion passage as they are, the order of the print media is becomes opposite and thus to print the obverse side, the second print medium is supplied following the first print medium.

As described above, in the case in FIG. 11D, the minimum print cycle contains two transfer cycles. However, the number of times the transfer unit 36 is idly rotated is not counted.

FIG. 11E shows a special example wherein two or three sheets (toner images) are printed in the minimum print cycle in the print mode of monochrome/short paper (A4)/double-sided print. For example, a print engine capable of inverting two A4-size print media at the same time using passages 40f and 40e with passage 40c of inversion path as a plurality of lines are proposed in Japanese Unexamined Patent Publication No. 2000-351511. Using the print engine, a print mode of monochrome/short paper/double-sided print can be executed at higher speed. Printing three sheets (toner images) will be discussed. In printing two sheets (toner images), a third toner image is not formed and printing two sheets is the same as printing three sheets in turning of the transfer unit and the transfer cycles.

That is, as shown in FIG. 11E, a toner image on the second page (obverse) of the first print medium is formed on the initial transfer unit and is transferred to the first print medium. While the first print medium passes through the inversion passage, a toner image of the fourth page (reverse) of the second print medium and a toner image of the sixth page (reverse) of the third print medium are formed on the transfer unit at the second turn and are transferred to the second and third print media (if two sheets (print media) are printed, a third toner image is not formed). Then, after the transfer unit is idly turned one turn, the first print medium is again fed and thus at the fourth turn, a toner image of the first page (obverse) of the first print medium is formed on the transfer unit and is transferred to the print medium.

Further, during the transfer unit is turned three, four turns, the second and third print media are inverted at the same time in parallel inversion passages and the order is changed and the print media are fed in the order of the second and third print media. At the fifth turn, a toner image of the third page (obverse) of the second print medium and a toner image of the fifth page (obverse) of the third print medium are formed on the transfer unit and are transferred to the print media.

In the special example shown in FIG. 11E, the minimum print cycle contains four transfer cycles. Printing three sheets (print media) can be executed in the same minimum print cycle as printing two sheets (print media). Consequently, double-sided print of three or more sheets (print media) can be executed at higher speed.

To use the print engine proposed in Japanese Unexamined Patent Publication No. 2000-351511 mentioned above to print one sheet in the print mode of monochrome/A4/double-sided print, the print becomes the same as the left of FIG. 11D. However, the transfer unit 36 is idly turned two turns between the second page and the first page and is synchronized with re-feeding of print medium.

Figure 12:
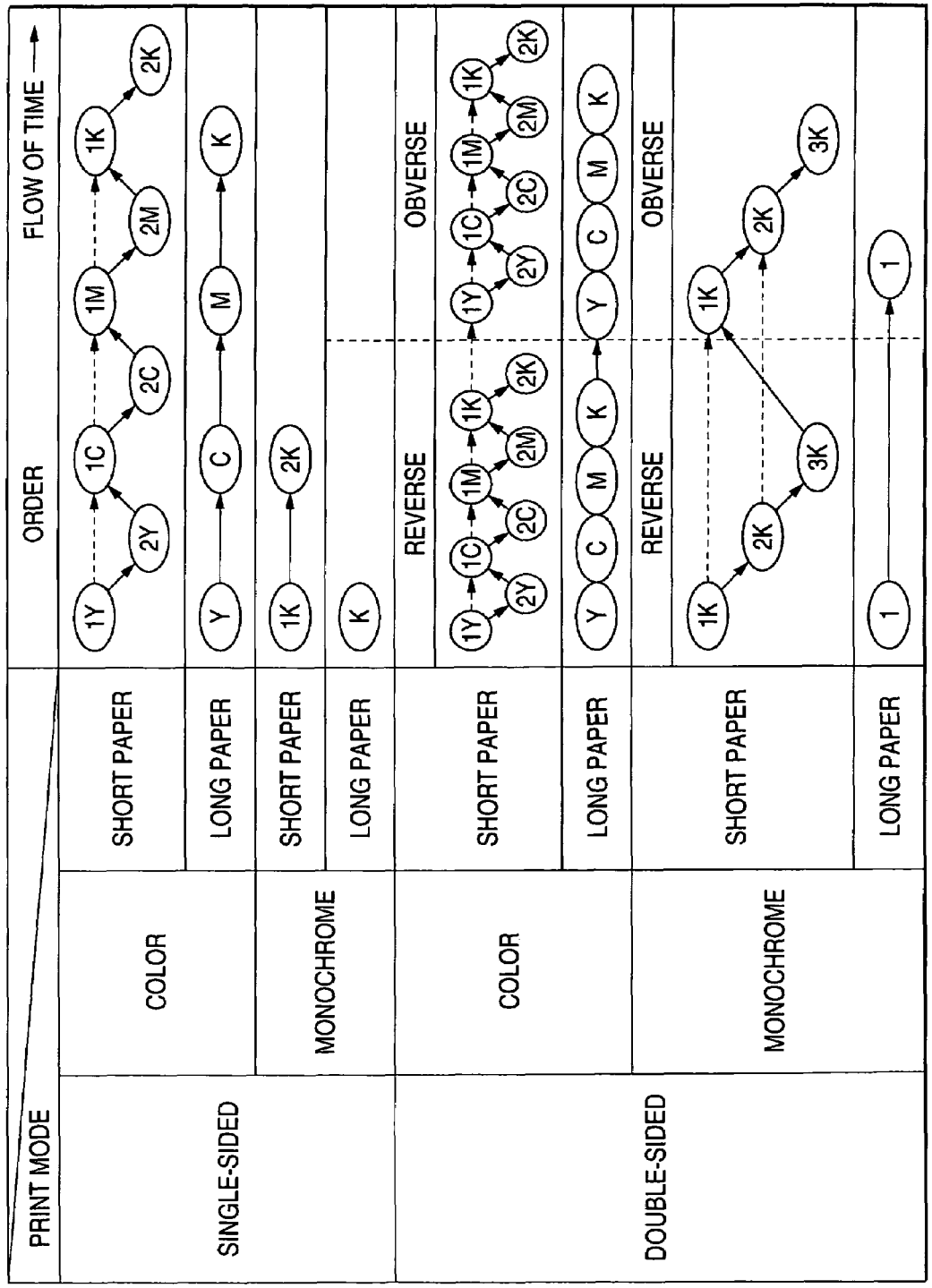
FIG. 12 is a chart to show the relationship between the print mode and the transfer order of print image data.

FIG. 12 is a chart to show the relationship between the print mode and the transfer order of print image data. When the print mode is single-sided/color/two sheets of short paper, print image data is transferred from the image processing controller 16 to the mechanical controller 20 in the order of yellow of the first sheet (1Y), yellow of the second sheet (2Y), cyan of the first sheet (1C), cyan of the second sheet (2C), magenta of the first sheet (1M), magenta of the second sheet (2M), black of the first sheet (1K), and black of the second sheet (2K), as indicated by the solid arrows. When the print mode is single-sided/color/ one sheet of short paper, print image data is transferred in the order of yellow (1Y), cyan (1C), magenta (1M), and black (1K), as indicated by the dashed arrows. The print image data is transferred in real time in synchronization with the turn cycle of the intermediate medium.

When the print data is single-sided/color/long paper, only one sheet can be printed, and image data is transferred in the order of yellow (Y), cyan (C), magenta (M), and black (K).

When the print mode is double-sided, the image data transfer in the single-sided print mode described above is executed for both reverse and obverse sides of the print medium. That is, two sets of toner image data are transferred in one minimum print cycle, and toner image formation on the transfer unit 36 and transfer to the print medium are executed. The one minimum print cycle contains two transfer cycles, as described above.

From the description made above, it is understood that how the print engine executes image formation in response to various print modes. Next, the protocol of the video interface between the image processing controller 16 and the mechanical controller 20 in each print mode will be discussed.

Figure 13:
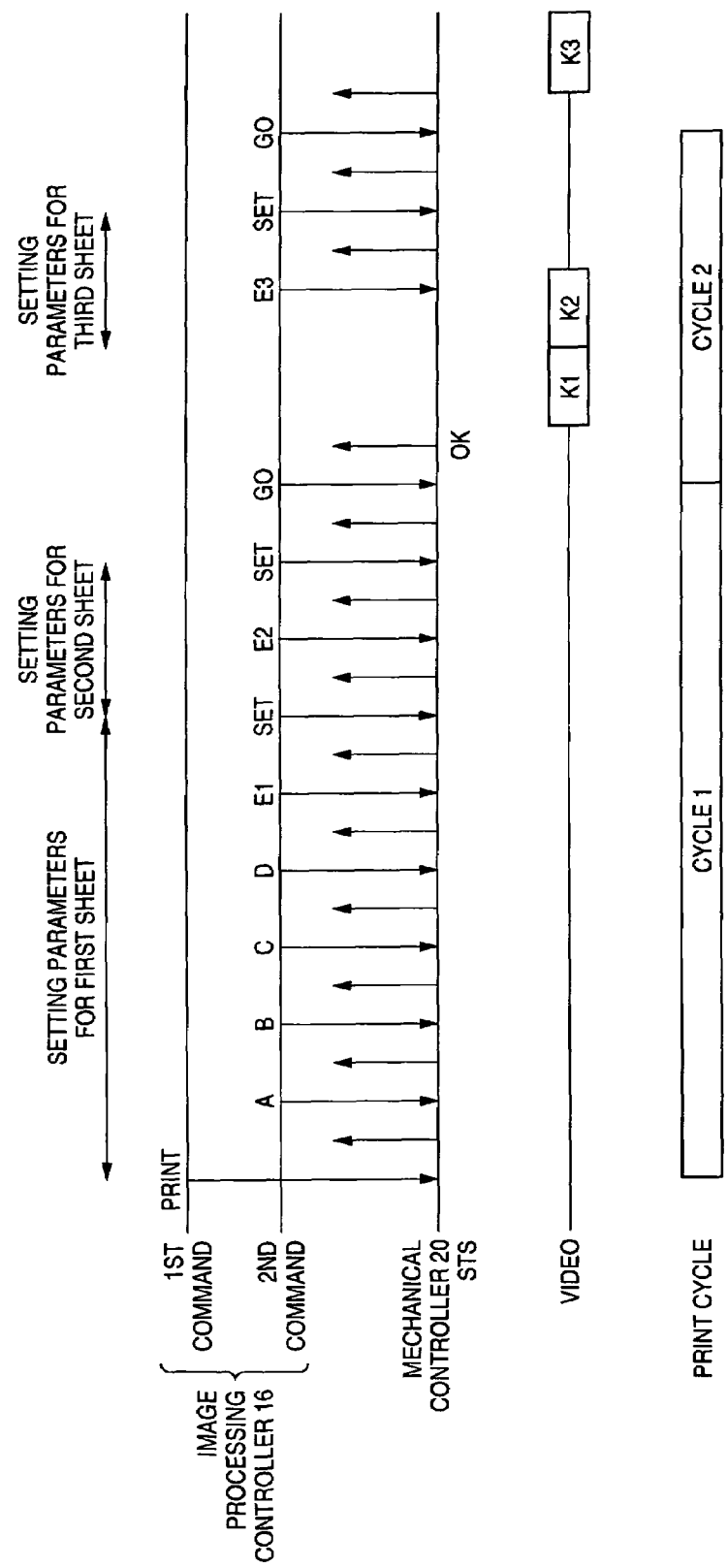
FIG. 13 is a timing chart of the video interface in the print mode of single-sided, monochrome, three sheets of short paper.

FIG. 13 is a timing chart of the video interface in the print mode of single-sided/monochrome/three sheets of short paper. The commands issued by the image processing controller 16 are put into a hierarchy as described above. The image processing controller 16 first issues a print command (print instruction) as a first-layer command and transmits the command to the mechanical controller 20. The mechanical controller 20 responds to the command with a status signal STS indicating whether or not the state is print-possible state.

The status signal STS consists of, for example, eight bits and contains a bit indicating whether or not the next print is possible, a bit indicating whether or not the print engine is executing print, a bit for making a print engine calibration request, a bit indicating preparation after power on, a bit indicating whether or not the printer is in suspend mode according to a suspend instruction, an operation call bit indicating occurrence of a paper jam, etc., and the like. The image processing controller 16 receives the status signal STS and can recognize that the command is surely received, and detect the current engine state. For example, if the bit indicating whether or not the next print is possible indicates print-impossible state, the image processing controller 16 cannot issue a GO command (print start instruction).

Following the print command, the image processing controller 16 issues a plurality of second-layer commands and sends required parameters corresponding to the print mode to the mechanical controller 20. For example, the image processing controller 16 consecutively issues a command A indicating monochrome, a command B indicating single-sided, a command C indicating plain paper, a command D indicating short paper (A4 size), and a command E1 indicating which bin of the multi-bin unit. In this case, a status signal STS from the mechanical controller 20 is received and checked whenever each command is issued as with the print command.

When the second-layer commands for setting the print parameters for one page are issued, a SET command indicating the end of the commands for one page is issued. Upon reception of the SET command, the mechanical controller 20 recognizes the termination of reception of the print parameters for one page.

In the example, the print mode is short paper and thus toner images for two sheets are formed on the intermediate medium of the transfer unit at the same time and then can be transferred to print media. Then, in the example in FIG. 13, second-layer commands for setting the print parameters for the second sheet are issued. In this case, to eliminate issuing of the second-layer commands for the second page overlap with the commands for the first page, only the second-layer commands for the second page different from the commands for the first page are issued. For example, the command A indicating monochrome, the command B indicating single-sided, the command C indicating plain paper, and the command D indicating short paper (A4 size) for the second page are the same as those for the first page, but a command E2 indicating the position of a bin of the multi-bit unit is different from the command E1 and thus only the command E2 is issued and a SET command is issued. Upon reception of the set command, the mechanical controller 20 recognizes that the bin position of the multi-bin unit is different and other print parameters are the same, and references the second-layer commands for the first page. Thus, the mechanical controller 20 retains all received second-layer commands in a buffer and overwrites the commands with the second-layer commands later sent.

Since the print media are short paper, the number of sheets that can be printed in one minimum print cycle is two. Therefore, after the second SET command is issued, the image processing controller 16 issues a GO command indicating the timing of print start in response to a status signal STS. After the image processing controller 16 checks that the status signal STS responding to the GO command indicates print-possible state, the image processing controller 16 transfers print image data pieces K1 and K2 generated in image processing to the mechanical controller 20 at the timing synchronized with the operation of the exposure unit, the exposure drum, and the transfer drum in the print engine. Monochrome toner images on two pages are formed on the transfer drum in accordance with the image data pieces K1 and K2 for the first and second sheets and are transferred to two sheets of plain paper together and are discharged to different bins.

Next, second-layer commands for printing the third page are issued. For the third page, only the bin position of the multi-bin unit is different and thus only a second-layer command E3 is issued and then a SET command is issued. Consequently, the mechanical controller 20 sets the print parameters for the third page based on the second-layer commands A, B, C, and D for the first page and the command E3. In this case, the fourth page does not exist and thus upon reception of a status signal STS responding to the SET command, the image processing controller 16 issues a GO command as a print start instruction. After the image processing controller 16 receives a status signal STS responding to the GO command, the image processing controller sends print image data K3 in synchronization with the operation of the print engine.

As described above, in the example in FIG. 13, three sheets of short paper can be printed in two minimum print cycles. For color print, print image data is transferred in the order of Y, M, C, and K after the GO command. In this case, the print image data is transferred consecutively in synchronization with the operation of the print engine.

As described above, one GO command is issued in the minimum print cycle of the print engine and the SET command indicates the end of the first-layer and second-layer commands for one page. Therefore, the number of the SET commands preceding the GO command indicates the number of print sheets in the minimum print cycle. Based on the set command, the mechanical controller 20 can recognize the preceding commands sent for the preceding page plus the current commands different from the preceding commands sent just before as the second-layer commands for the current page. Consequently, the number of commands transferred via the video interface can be reduced. Further, information of the number of print sheets in the minimum print cycle can also be added to the SET command.

FIG. 14 is a timing chart of the video interface in the print mode of double-sided/color/three sheets of short paper. As in FIG. 13, to set the print parameters for the first sheet, a print command i.e. first-layer command and a plurality of second-layer commands A, B, C, D, and E1 are issued, and each time the mechanical controller 20 returns a status signal STS. A SET command indicating the termination of setting the print parameters for the first sheet is issued. Next, to set the print parameters for the second sheet, only a second-layer command E2 for setting the position of a bin of the multi-bit unit is issued and a SET command is issued. Last, a GO command is issued and a status signal STS indicating print-possible state is received from the mechanical controller 20. Then, the image processing controller 16 transfers print image data for reverse sides of the first and second sheets and print image data for obverse sides of the first and second sheets consecutively as shown in the figure so as to make it possible to execute double-sided color print of two sheets. In conformity with the image date, the print engine forms two toner images on the transfer unit and transfers and fixes the toner images to and on two sheets of short paper. The number of sheets in the minimum print cycle is set according to the number of SET commands up to the GO command. The transfer order of the print image data is exactly as shown in the chart of FIG. 12.

Next, to print the third sheet, the image processing controller 16 issues required commands. In the example in FIG. 14, the print mode of the third sheet is the same as that of the second sheet. In this case, the image processing controller 16 issues the same color command A as that set for the preceding preceding page and refers the status signal STS of the print engine. If print-possible state is indicated, the image processing controller 16 issues a SET command. Upon reception of a status signal STS responding to the SET command, the image processing controller 16 issues a GO command as the print start timing of the third sheet. Responding to a status signal STS responding to the go command, the image processing controller 16 transfers color print image data of the third sheet to the mechanical controller 20 in the order of the reverse and obverse sides of the third sheet.

Also in the example in FIG. 14, the minimum print cycle is controlled by the GO command and the number of the SET commands preceding the GO command controls the number of print sheets in the minimum print cycle. Further, the SET command indicates determination of change in the second-layer commands corresponding to the print mode. Therefore, issuing commands for one page and issuing a SET command are repeated and last a GO command is issued, whereby the protocol of the video interface can be optimized.

FIG. 15 is a timing chart of the video interface in print when an error occurs. This example assumes the print mode of single-sided/color/two sheets of short paper. As described above, each time the image processing controller 16 issues each of the first-layer and second-layer commands, the mechanical controller 20 returns a status signal STS and indicates whether or not the state is print-possible state. When the SET commands as the number of sheets printed in the minimum print cycle are issued and the status signal STS responding to the SET command indicates print-possible state (OK), the image processing controller 16 issues a GO command indicating the operation start of the print engine.

At this time, if the status signal STS responding to the last SET command indicates the print-possible state, the image processing controller 16 does not transfer print image data until it checks that the status signal STS responding to a GO command indicates the print-possible state. Since each command or status signal is serially transferred in eight bits, the time interval between reception of the status signal corresponding to the last SET command and the transmission completion of the GO command may be long, and whether or not the state is print-possible state is checked again based on the status signal responding to the GO command. Accordingly, hanging up of the printer caused by an error in the print engine occurring after reception of the status signal corresponding to the last SET command can be avoided.

In the example in FIG. 15, the status signal STS responding to the GO command indicates print-impossible state (NG). For example, when one bit of the status signal indicates an operation call state due to a paper jam occurs, the image processing controller 16 stops transferring print image data. Accordingly, hanging up of the printer can be avoided.

Then, the image processing controller 16 periodically issues a GET command and monitors a status signal STS responding to the GET command whereby detecting the print engine being restored to the print-possible state. Upon detection of the print-possible state (OK), the image processing controller 16 issues a print command of a first-layer command and issues required second-layer commands, then issues a SET command and a GO command. If the status signal STS responding to the GO command indicates print-possible state, the image processing controller 16 transfers print image data to the mechanical controller 20. Since the GET commands are issued after the error occurs, a print command is issued after the printer is restored from the error, whereby the later SET command and GO command of second-layer commands can be effective.

The protective scope of the invention is not limited to the above-described specific embodiment and covers the scope of the invention defined by the appended claims and equivalents of the invention.

As described above, according to the invention, the commands transmitted from the image processing controller to the engine are classified into a plurality of layers and transmission of the superior-layer commands can be skipped depending on the situation, whereby a larger number of types of information than that in the related art can be transferred without incurring a drastic increase in the communication time while the communication architecture in the related art is maintained.

Further according to the invention, a set command indicating the end of print commands for each page and a go command indicating the print start timing are combined, whereby the video interface between the image processing image processing controller and the mechanical controller can be optimized. Further, even if the status signal responding to the set command indicates a print-possible state, if the status signal responding to the later issued go command indicating the print start timing indicates a print-impossible state, print start can be canceled and hanging up of the electronic printer is avoided.

What is claimed is:

1. A printer comprising:
   a controller for transmitting commands representing various instructions; and
   an engine for executing print based on the transmitted commands, wherein
   the engine comprises a mechanical section and a mechanical controller which controls the mechanical section according to the transmitted commands,
   the transmitted commands are classified into a plurality of layers,
   each of the instructions is determined by at least a first command of a superior layer and a second command of a subordinate layer of the plurality of layers,
   the mechanical controller holds the first command last received until reception of another first command,
   when the mechanical controller receives the first and second commands, the mechanical controller controls the mechanical section according to the instruction specified by the received first and second commands, and
   when the mechanical controller receives the second command without receiving the first command, the mechanical controller controls the mechanical section according to the instruction specified by the first command last held by the mechanical controller and the second command now received.

2. The printer according to claim 1, wherein
   each of the transmitted commands contains information concerning the layer in which the transmitted command belongs.

3. The printer according to claim 1, wherein
   when the transmitted commands include a portion for setting parameters and
   when the engine receives the portion for setting parameters in a print execution time, the mechanical controller holds setup values of the parameters until reception of another command including another portion for setting each of the parameters.

4. The printer according to claim 1, wherein after execution of a previous printing operation in a print execution time,
   when the mechanical controller receives transmitted commands for setting all parameters to be set after execution of the previous printing operation, the engine executes a next printing operation in accordance therewith, and
   when the mechanical controller receives transmitted commands for setting a part of all parameters to be set, the engine executes a next printing operation in accordance therewith and in accordance with the setup values of the last received transmitted commands for parameters contained therein that are different than the part of all parameters.

5. The printer according to claim 1, wherein
   when the instructions includes an instruction regarding execution of printing, the instruction regarding the execution of printing is specified by the first command, and another instruction which varies in accordance with the each of instructions is specified by the second command, each of instructions concerning execution of printing is specified by a first command meaning execution of printing and a second command varying in accordance with the instructions.

6. The printer according to claim 1, wherein the second command includes a print parameter information command portion and a set command portion, the set command portion indicating the end of the print parameter information command portion for each print page.

7. The printer according to claim 6, wherein the mechanical controller executes the instruction for a current print page based on the print parameter information command portion received preceding the current set command portion and the print information parameter command portion received prior to the preceding set command portion in response to the set command portion.

8. The printer according to claim 6, wherein the instruction for a current print page is specified by a current print information parameter command portion for the current print page and a preceding print information parameter command portion for the preceding print page different from the current print information parameter command portion in response to the set command portion for the current print page.

* * * * *